US012122335B2

(12) United States Patent
Walker et al.

(10) Patent No.: US 12,122,335 B2
(45) Date of Patent: Oct. 22, 2024

(54) OPPORTUNISTIC VEHICLE AIR BRAKE SYSTEM PRESSURIZATION SYSTEMS AND METHODS

(71) Applicant: PACCAR Inc, Bellevue, WA (US)

(72) Inventors: Jeremy David Walker, Denton, TX (US); Ian Ramsay Hunt, Denton, TX (US)

(73) Assignee: PACCAR INC., Bellevue, WA (US)

( * ) Notice: Subject to any disclaimer, the term of this patent is extended or adjusted under 35 U.S.C. 154(b) by 283 days.

(21) Appl. No.: 17/521,330

(22) Filed: Nov. 8, 2021

(65) Prior Publication Data

US 2023/0145214 A1 May 11, 2023

(51) Int. Cl.
*B60T 13/66* (2006.01)
*B60L 1/00* (2006.01)
*B60L 7/10* (2006.01)
*B60L 53/10* (2019.01)
*B60T 17/02* (2006.01)
*B60T 17/22* (2006.01)

(52) U.S. Cl.
CPC ............ *B60T 13/662* (2013.01); *B60L 1/003* (2013.01); *B60T 17/02* (2013.01); *B60T 17/221* (2013.01); *B60L 7/10* (2013.01); *B60L 53/10* (2019.02); *B60T 2270/60* (2013.01); *B60T 2270/88* (2013.01)

(58) Field of Classification Search
CPC ...... B60T 13/662; B60T 17/02; B60T 17/221; B60T 2270/60; B60T 2270/88; B60L 1/003; B60L 53/10; B60L 7/10
See application file for complete search history.

(56) References Cited

U.S. PATENT DOCUMENTS

| | | | |
|---|---|---|---|
| 2010/0301810 A1* | 12/2010 | Biondo | B60L 53/66 320/155 |
| 2012/0316713 A1* | 12/2012 | Pfefferl | H02P 29/027 903/903 |
| 2013/0204472 A1* | 8/2013 | Pfefferl | B60W 20/00 701/22 |

* cited by examiner

*Primary Examiner* — Andrew J Cromer
(74) *Attorney, Agent, or Firm* — Merchant & Gould, P.C.

(57) ABSTRACT

Systems and methods for providing opportunistic vehicle air brake system pressurization are disclosed. Vehicle air tanks used within an air brake system are pressurized during a time a battery charging status is satisfied. For example, such air tanks may be pressurized via an air compressor at a time during which the vehicle is electrically connected to a power source other than a battery of the vehicle. An example of such a power source may include an electrical charger, such as an electric vehicle charging station, or an electric generator during a regenerative braking event. The air tanks may also be pressurized by using a battery to energize the air compressor, based on the battery being charged above a predetermined threshold.

15 Claims, 9 Drawing Sheets

OPPORTUNISTIC VEHICLE AIR BRAKE SYSTEM PRESSURIZATION SYSTEMS AND METHODS

BACKGROUND

Often, vehicles with air brake systems may experience small air leaks which can, over time, depressurize the air tanks carried by the vehicle. This is particularly the case when such vehicles are parked for an extended period of time. Recharging of air tanks is typically performed using an air compressor that is carried by such vehicles. However, if air tanks are significantly depressurized, it may take one to three minutes to recharge those air tanks before the air brake system may be reliably used.

This leads to a number of disadvantages. For example, a driver may arrive at a vehicle and may be required to initiate the re-pressurization of air tanks prior to departure. This can unnecessarily delay the driver's departure time. Furthermore, in vehicles having internal combustion engines, often accessory devices such as air compressors are powered by energy generated by the internal combustion engine, and therefore require the vehicle to be running for use of such accessory devices. In battery electric vehicles (BEVs) and plug-in hybrid vehicles (PHEVs), operation of an air compressor may occur at any time, but has the effect of draining the battery, thereby potentially reducing the effective operating range of the vehicle on a given charge. Electric air compressors can be similarly used with vehicles that use internal combustion engines, but the low voltage battery charge, not impacting range, will be reduced instead.

SUMMARY

The disclosure generally relates to systems and methods for providing opportunistic vehicle air brake system pressurization. For example, in some instances, vehicle air tanks used within an air brake system are pressurized during a time at which the vehicle is electrically connected to a power source other than or in addition to a battery of the vehicle. An example of such a power source may include an electrical charger, such as an electric vehicle charging station, or an electric generator during a regenerative braking event.

In a first aspect, a method includes determining that a battery recharging event is in progress for a battery of a vehicle. The method further includes, based on a determination that the battery recharging event is in progress, determining a pressure of an air brake system of the vehicle. The method also includes, upon determining that the pressure of the air brake system is below a predetermined threshold during the battery recharging event, activating an air compressor included in the air brake system during the battery recharging event. Activating the air compressor during the battery recharging event is performed by powering the air compressor from an electrical power source other than the battery.

In a second aspect, a vehicle is disclosed that includes a battery operable to power an at least partially electric drivetrain, as well as an air brake system including an air compressor. The vehicle includes a control circuit including a processor and a memory. The memory stores instructions executable by the processor to: determine that a battery recharging event is in progress for the battery; based on a determination that the battery recharging event is in progress, determine a pressure of an air brake system of the vehicle; upon determining that the pressure of the air brake system is below a predetermined threshold during the battery recharging event, activate the air compressor during the battery recharging event. Activating the air compressor during the battery recharging event is performed by powering the air compressor from an electrical power source other than the battery.

In a third aspect, a non-transitory computer-readable storage medium storing computer-executable instructions is disclosed. When executed by a control circuit of a vehicle, the instructions cause the control circuit to perform a method of pre-conditioning an air brake system of a vehicle. The method includes assessing a battery charging status for a battery of a vehicle, and, upon determining that a battery charging status meets a predetermined condition determining a pressure of an air tank within the air brake system of the vehicle. The method also includes, upon determining that the pressure of the air brake system is below a predetermined threshold, activating an air compressor included in the air brake system. Determining the battery charging status includes at least one of (1) determining that the battery is connected to an external power source, (2) determining that electrical power is being generated by regenerative braking that is in excess of a battery recharging capacity, or (3) determining that the battery has a charge level above a predetermined threshold.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following figures.

DETAILED DESCRIPTION

Figure 1:
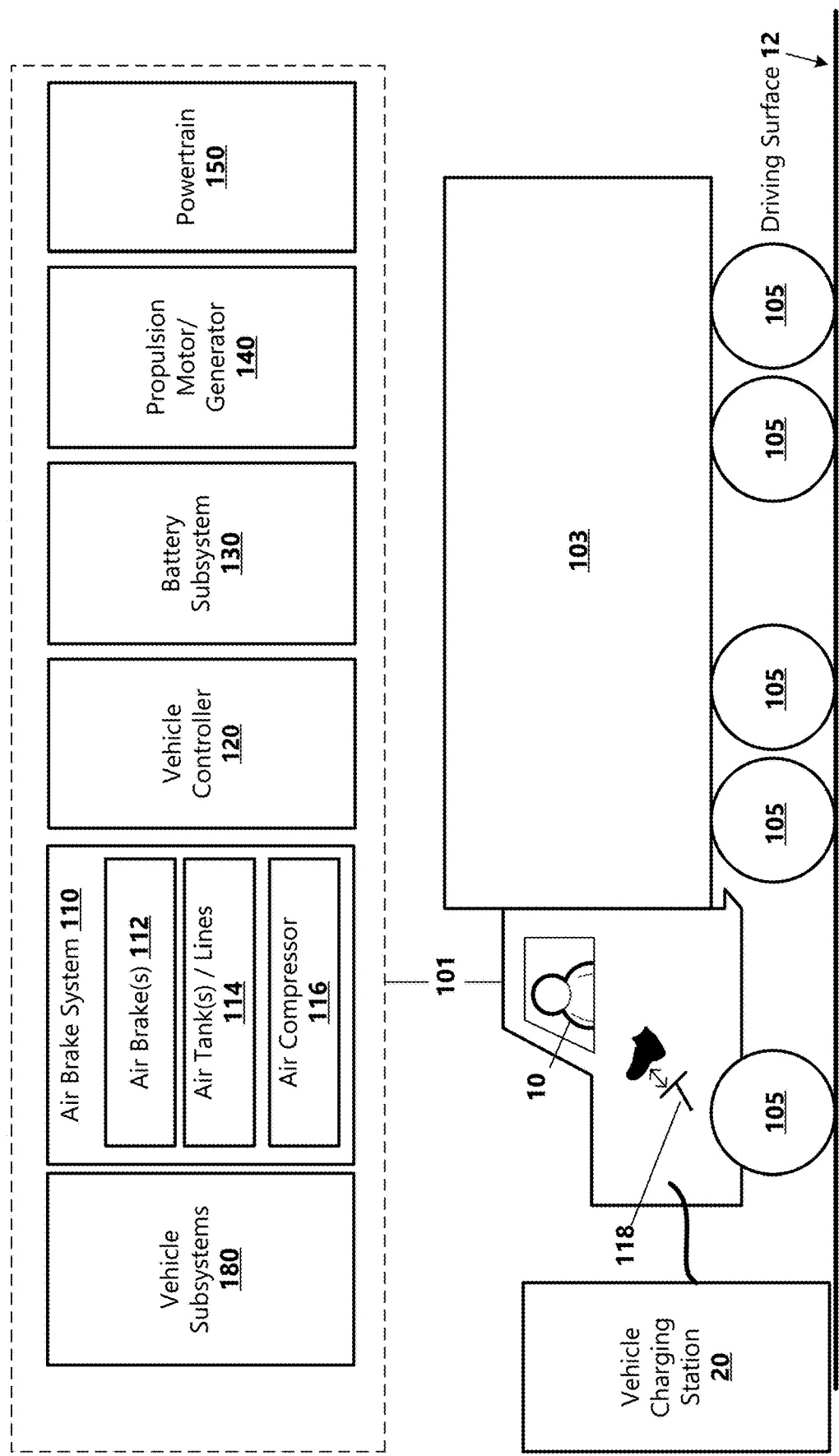
FIG. 1 is an illustration depicting a side view of a vehicle implementing an opportunistic vehicle air brake system repressurization.

As briefly described above, embodiments of the present invention are directed to systems and methods for opportunistic vehicle air brake system pressurization. In some aspects, an air compressor associated with a vehicle air tank automatically monitors air pressure within the air tank, and automatically runs on an as-needed basis while the vehicle is connected to a source of electricity other than a battery of the vehicle, in particular in instances where the battery of the vehicle is not currently being charged. For example, on an as needed basis, the air compressor may be actuated to re-pressurize air tanks for a vehicle's air brake system during a period in which regenerative braking occurs, or in which some other external electricity source (non-vehicle battery source) is provided.

In accordance with the present disclosure, the selective use of an air compressor during appropriate times provides a number of benefits to vehicle operators, as well as improvements in vehicle operation. Regarding the vehicle operator, by re-pressurizing air tanks when an electric air compressor is electrically connected to an external power source, time may be saved during truck startup. Specifically, a vehicle operator may be required to wait for 1 to 3 minutes for air tanks to pressurize after a vehicle has been started. By preemptively recharging air tanks, this delay may be avoided. Additionally, the vehicle operator would not be exposed to the noise, vibration, or harshness that is introduced by operation of the air compressor, since the vehicle operator would not need to be nearby during air compressor operation.

The methods described herein provide advantages to vehicle operation itself. For example, in some instances a vehicle battery is incapable of recharging at a rate equal to the rate of energy recaptured via regenerative braking. That is, regenerative braking generates more energy than may be received by the vehicle battery. Using the air compressor when the vehicle battery is incapable of keeping up with the regenerative braking power input will improve the regenerative braking power capabilities. This additional energy may be used to power an electric air compressor to recharge the air brake system of the vehicle, thereby providing more efficient vehicle operation by avoiding loss of the excess regenerative energy occurring during regenerative braking. Still further, providing such energy directly to an air compressor, rather than first to a battery from regenerative braking and then to the air compressor improves efficiency of power delivery, since some efficiency loss would otherwise be experienced in charging and discharging the vehicle battery.

Additionally, by powering the air compressor from a non-battery power source (e.g., an external power connection or from regenerative braking events), avoidance of using the battery may result in improved range in electric or hybrid vehicles, since stored energy in the battery may be used for vehicle propulsion rather than to power and air compressor. Still further, because use of the battery is avoided, a decrease in the number of charging and discharging events from the battery may reduce the wear rate of the battery, and therefore increase battery life.

In example embodiments, a threshold may be set for a pressure of the vehicle air brake system, and in particular one or more pressurization tanks used in such an air brake system. In examples, a low pressure threshold requires air pressure above 65 pounds per square inch (psi). However, in other examples, a higher threshold air pressure may be utilized.

In still further example embodiments, air brake system re-pressurization may be performed based on a battery status other than its current status as being recharged. For example, a battery charge status of being charged above a predetermined threshold (e.g., 85%-90%, or some other predetermined charge level) may be a condition that, if satisfied, would allow for actuation of an air compressor to perform air brake system re-pressurization, regardless of whether that battery is currently being charged.

In some instances, to ensure that air brake system re-pressurization occurs shortly before a vehicle is operated (and is not unnecessarily operated at a time significantly before a next scheduled vehicle operation), a re-pressurization operation may be performed based on a combination of observed events. For example, re-pressurization may be based on detection of both an external electrical connection provided to the vehicle (e.g. at an electric vehicle recharging station) or battery charge status, as well as initiation of another vehicle preconditioning operation. For example, air brake system re-pressurization may be scheduled to occur at the same time as or in close temporal proximity to vehicle cabin climate conditioning which may occur shortly before scheduled operation of the vehicle. Other indications that a vehicle is about to be operated may also be used to initiate air brake system re-pressurization, such as detecting that a door is opened, detecting that a check light switch is actuated, determining, from vehicle telematics messages received at the vehicle, that the vehicle is scheduled to be operated, or detecting that a propulsion battery pack is being preconditioned for operation (e.g., being heated in a cold environment to improve battery performance). In still further examples, a vehicle controller may be configured to predict when the vehicle will next be operated and can initiate an air brake system re-pressurization process in advance of that predicted operation timing. For example, the vehicle controller can assess prior periods of operation, or may be programmed to receive a particular vehicle operation schedule. In some instances, predicting impending operation of the vehicle may be performed based on a model of past vehicle operation.

In the case of electric vehicles, it is often the case that cabin climate conditioning (or pre-conditioning) may be performed in conjunction with battery charging. In particular, while an electric vehicle is electrically connected to a charging station, the electric vehicle may have one or more controllers that detect the charging condition, and in response, may pre-condition the interior environment of the vehicle, for example through use of an air conditioner or heater. Accordingly, the cab of a vehicle is already at an appropriate temperature at the time the driver enters the vehicle. The driver does not need to either (1) wait for vehicle air conditioning to occur before departing the charger, or (2) draw battery energy for purposes of air conditioning the cab.

In example implementations, a scheduled cabin climate conditioning program may be used to turn on an electric air compressor to charge air tanks used for the air brakes of an electric vehicle. The electric air compressor may then optionally use charger power, rather than depleting the battery of the vehicle.

FIG. 1 is an illustration depicting a side view of a vehicle 101 implementing an opportunistic vehicle air brake system repressurization, according to an example embodiment of the present disclosure. The vehicle 101 is one example of a type of vehicle that may be used in accordance with the opportunistic vehicle air brake system repressurization processes described herein.

In some examples, the vehicle 101 may be a heavy-duty truck such as a part of a tractor-trailer combination. The vehicle 101 may have what is sometimes referred to as, a fifth wheel by which a box-like, flat-bed, or tanker semi-trailer 103 (among other examples). may be attached for transporting cargo or the like. While the vehicle 101 is depicted as a truck in FIG. 1, it should be appreciated that the present technology is applicable to any type of vehicle where automated throttle filtering may be desired.

In the example shown, the vehicle 101 may be operated by an operator 10, along a driving surface 12. The vehicle 101, in the example shown, includes an air brake system 110, a vehicle controller 120, a battery subsystem 130, a propulsion motor 140 (e.g. sometimes operable as a generator and referred to in some instances as a motor/generator), a powertrain 150, and one or more other vehicle subsystems.

In the example shown, the air brake system 110 may include air brakes 112, one or more air tanks 114, and lines there between, as well as an air compressor 116. The air brake system 110 is described in greater detail in conjunction with an example schematic view seen in FIG. 2; generally, the air brake system is operable by a vehicle operator 10 who presses on a brake pedal 118 to release air from air tanks 114 to actuate the air brakes 112. On an as needed basis, and air compressor 116 may be operated to re-pressurize the air tanks 114 and lines connecting the air tanks with air brakes 112. The air compressor 116 may be powered, for example as selected by vehicle controller 120, via battery subsystem 130.

As noted above, over time, a pneumatic pressure within an air brake system 110, in particular within air tanks or lines 114 may gradually decrease. Accordingly, it may be necessary to operate the air compressor 116 periodically, or shortly before operation of the vehicle 101. As further described herein, methods of selecting opportunistic times for operating the air compressor 116 allow for improved efficiency and reduced usage of battery capacity of the battery subsystem 130, thereby improving overall efficiency in operation of the vehicle 101, in particular in instances where the vehicle 101 corresponds to an electric vehicle.

The vehicle controller 120 includes a programmable circuit, such as a computing device, which may be operable to control one or more subsystems of the vehicle 101. For example, the vehicle controller 120 may receive one or more sensor signals associated with the air brake system 110, battery subsystem 130, motor 140, powertrain 150, or other vehicle subsystems 180, and may provide control signals, for example via a control bus within the vehicle, for actuating one or more subsystems in response to sensed conditions and/or user inputs. In some example embodiments, the vehicle controller 120 may include instructions for opportunistic recharging of the air brake system 110 in response to sensed or predicted vehicle conditions or operational statuses, as described in further detail below.

The battery subsystem 130 includes one or more batteries that are usable to power accessory subsystems within the vehicle 101, as well as optionally batteries used to power the motor 140 and associated drivetrain 150 (e.g., in the case of the electric or plug-in hybrid electric vehicle). In some example instances, the battery subsystem 130 may include a connector configured to receive a connection from an external electrical source, such as a vehicle charging station 20.

The propulsion motor 140 and associated powertrain 150 may operate to generate power and to convert the power into movement. For example, the propulsion motor 140 may include a power source, such as an engine, and the powertrain 150 various components that operate to convert the engine's power into movement of the vehicle (e.g. the transmission, driveshafts, differential, and axles). The powertrain 150 may be one of various types of powertrains (e.g., diesel, hydrogen fuel cell, battery electric). In some examples, the powertrain 150 may be operable with the propulsion motor 140 to selectively operate as a generator, for example in the case of a regenerative braking arrangement. In an example implementation and as will be described in further detail below, one or more criteria for operating the air compressor 116 may include that the propulsion motor 140 is generating energy in excess of a recharging capacity of the battery subsystem 130 in response to a vehicle operator's 10 engagement of a brake pedal 118. Accordingly, in such circumstances, the propulsion motor 140 may generate and supply electrical power to the vehicle from a location external to the battery subsystem 130 which may be provided to other vehicle systems, such as the air brake system 110 and in particular the air compressor 116.

In an example where the powertrain 150 comprises a battery electric powertrain operable with an electric motor implementing the propulsion motor 140 and battery subsystem 130 (or, in the alternative, a plug-in hybrid drivetrain that uses, in part, electrical power from battery subsystem 130 for power to the propulsion motor 140 and in part uses an internal combustion engine to drive the powertrain 150), the vehicle 101 may be operatively connectable to a vehicle charging station 20. The vehicle charging station 20 may be a home or commercial vehicle charging station capable of supplying external electrical power to the vehicle, in particular for recharging battery subsystem 130. Supply of electrical power to vehicle subsystems from a vehicle charging station may also correspond to a criteria for operating the air compressor 116 in an opportunistic manner.

The vehicle 101 may include one or more other vehicle subsystems 180, such as accessory power systems, lighting systems, vehicle cabin temperature conditioning systems, communication systems, and various other types of equipment. Each of the other vehicle subsystems 180 may also be powered via the battery subsystem 130.

Figure 2:
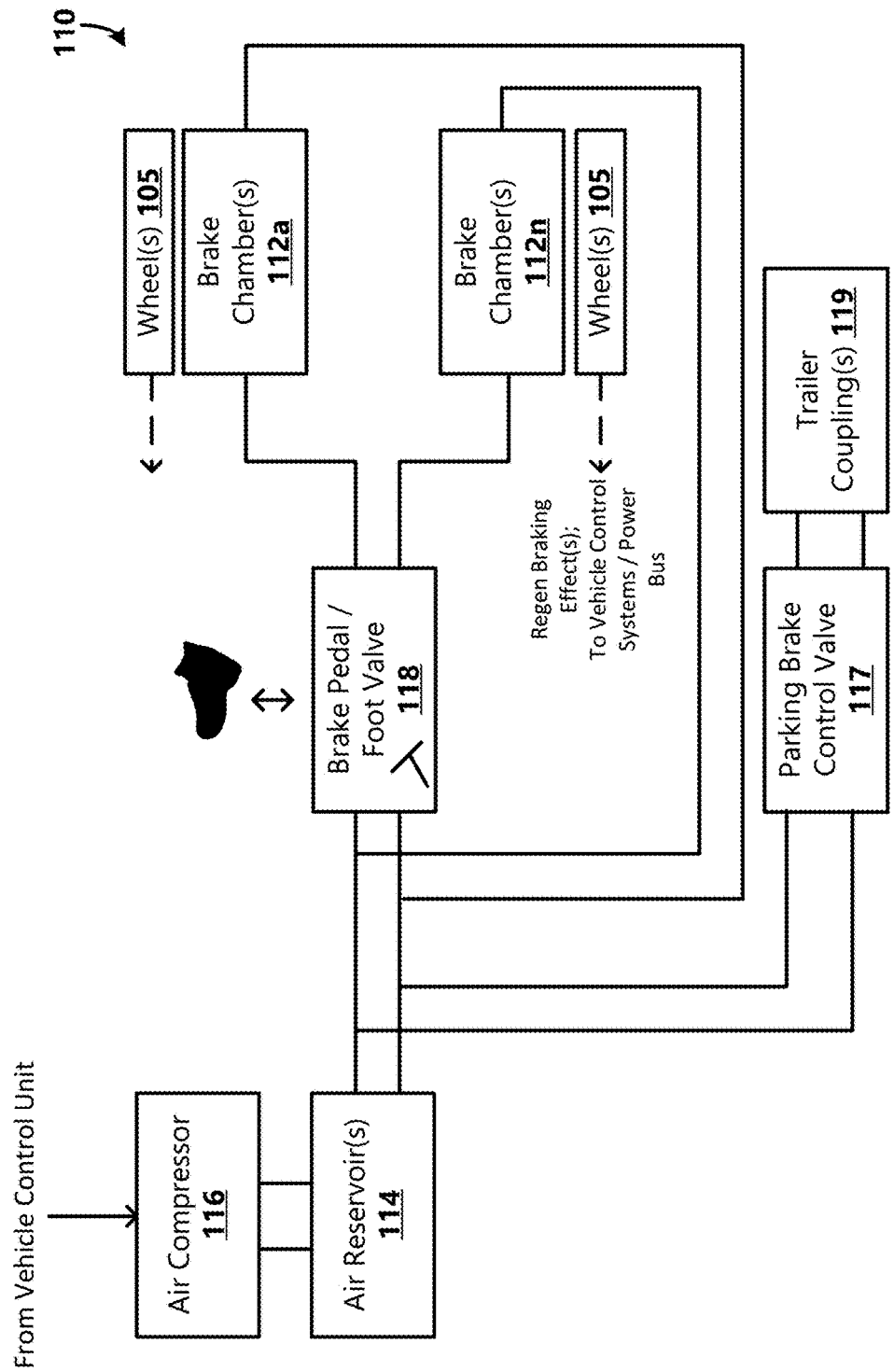
FIG. 2 is a schematic block diagram of a portion of an air brake system of a vehicle, such as the vehicle of FIG. 1.

FIG. 2 is a schematic block diagram of a portion of an air brake system 110 of a vehicle, such as the vehicle 101 of FIG. 1. In the example shown a vehicle operator may actuate a brake pedal 118, which will release air stored in pressurized air reservoirs 114 toward brake chambers 112a-n. The pressurized air may then be used to actuate breaks at wheels 105. Additionally, in some embodiments, a parking brake control valve 117 may be pneumatically connected to trailer couplings 119, thereby providing an air supply from the air reservoir 114 to trailer couplings, for example for connection to breaks chambers of a braking system included within semi-trailer 103.

As noted above, an air compressor 116 may provide an air supply to the air reservoir is 114, and may be actuated by signals from a vehicle control unit, such as vehicle controller 120. For example, vehicle controller 120 may monitor a pressure within the air reservoirs 114, or within lines between the reservoirs 114 and either the brake pedal 118 or parking brake control valve 117, to ensure adequate air pressure within the reservoirs and/or lines to be able to effectively actuate braking systems of the vehicle 101. In example embodiments, adequate air pressure corresponds to an air pressure above approximately 65 psi, and preferably up to or exceeding 100 psi. That is, at pressures below about 65 psi, and certainly below about 60 psi, air pressure within the air reservoirs 114 may be inadequate, when provided to break chambers 112a-n, to provide adequate braking power to slow the vehicle 101 or otherwise maintain the vehicle in a stopped position.

As noted in FIG. 2, when a vehicle 101 is in operation, and in motion, the wheels 105 may be in rotation, and brakes may be actuated (e.g., via brake chambers 112a-n). In further embodiments, other manners of applying braking may be provided as well, for example through use of engine braking, or maintaining an engaged relationship between motor 140 and the powertrain 150 leading to the wheels 105. If the motor 140 remains engaged with the powertrain 150 and wheels 105, in some examples, in particular where the vehicle 101 is a battery electric vehicle or plug-in hybrid vehicle, the rotation of wheels 105 may result in operation of the motor 140 as a generator, thereby generating electrical power which may be provided back to the battery subsystem 130. Such a regenerative braking action may cause the vehicle to slow, and also may, during the regenerative braking action, generate and deliver electrical power to the battery subsystem 130. In some instances, the electrical power provided by regenerative braking may be greater than is usable to recharge the battery subsystem 130. That is, in such instances, the electrical power may be provided at a rate higher than a recharging rate of a battery subsystem 130. Accordingly, in some embodiments, an indication of excess electrical power available to the vehicle 101 may be one of the conditions in which the air compressor 116 may be actuated to re-pressurize air reservoirs 114 without requiring use of electrical power directly from the battery subsystem 130.

Figure 3:
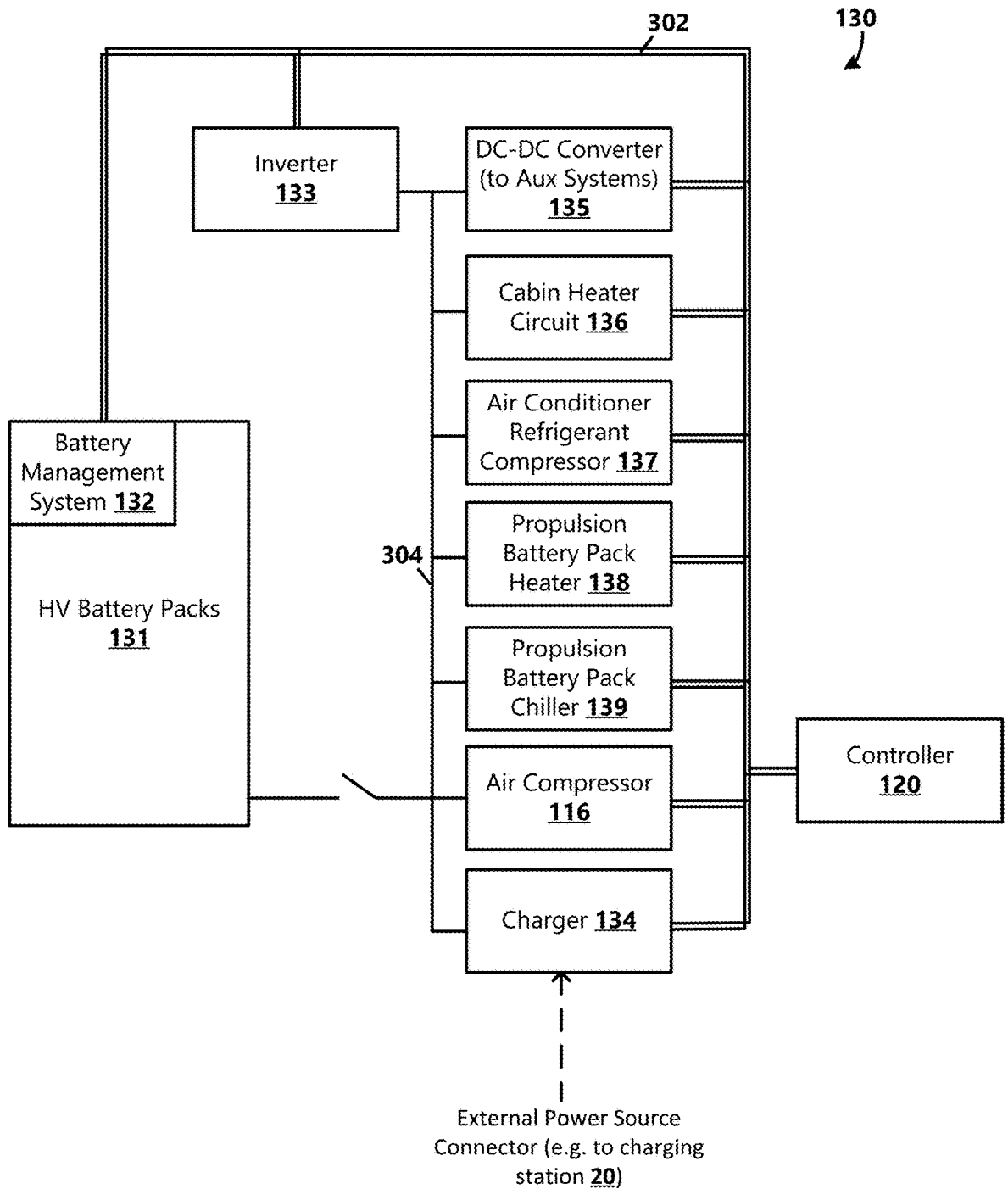
FIG. 3 is a block diagram of a portion of an electrical system of a vehicle, such as the vehicles of FIGS. 1-2.

FIG. 3 is a block diagram of a portion of an electrical system 130 of a vehicle, such as the vehicles of FIGS. 1-2. The electrical system 130 may be operatively connected to controller 120, as well as may be used to provide electrical power to one or more external systems as described below. In the example shown, the electrical system 130 can include one or more high voltage battery packs 131 managed by a battery management system 132, and connected to inverter 133 and a charger 134.

In the example shown, the high voltage battery packs 131 may be connected to a control and data bus 302 via the battery management system 132, which communicates with the controller 120, as well as various other vehicle subsystems, regarding battery levels and discharge rate. The battery management system 132 further provides voltage regulation and current control output from the battery packs 131 to control degradation of the battery packs due to rapid charging/output.

In the example shown, the inverter 133 is electrically connected to the high voltage battery packs 131 and the battery management system via both the control and data bus 302, as well as a high voltage bus 304. The inverter 133 provides electrical power to motor 140 to power drivetrain 150, for example by converting direct current (DC) energy to alternating current (AC) energy for use by an electric motor. The inverter 133 may also act to provide electrical energy back to the battery packs 131 in a regenerative braking situation, as previously described, via the high voltage bus 304. The charger 134 provides external charging capabilities for the battery packs 131, for example by providing an external electrical connection for use in connection to an external energy sources such as a vehicle charging station 20 as previously described, via the high voltage bus 304.

In the example shown, the controller 120 may monitor a state of the inverter 133 and/or charger 134, for example to determine an appropriate time to operate an auxiliary system, such as air compressor 116 as described above.

In the example shown, the battery packs 131 may provide electrical power to the air compressor 116, as well as a plurality of external systems, including a DC-DC converter 135, a cabin heater circuit 136, an air conditioner refrigerant compressor 137, a propulsion battery pack heater 138, and a propulsion battery pack chiller 139 via the high voltage bus 304. The air compressor 116 is generally an electrically-powered air compressor operatively integrated within an air brake system of the vehicle, such as is seen in FIG. 2. The DC-DC converter 135 may change a voltage level of output voltage from the battery packs 131 and battery management system 132, for example to power external systems, such as the air brake system 110 and or other vehicle subsystems 180. The cabin heater circuit 136, air conditioner refrigerant compressor, propulsion battery pack heater 138, and propulsion battery pack chiller 139 are each connected to an output of the battery packs 131 to receive electrical power via a high voltage bus 302, and to communicate with controller over a controller area network 304.

As noted above, based on various operational modes and circumstances in which electrical power may be available from sources other than the battery subsystem 130 (and in particular, from sources other than the battery packs 131), there are circumstances in which an air compressor may be allowed to operate using electrical power from such non-battery sources. For example, either during operation, or shortly before operation, of the vehicle, the air compressor 116 may be activated to repressurize air tanks 114 to an appropriate pressure for use. Air tanks may be depressurized over time (e.g., experiencing a reduction in pressure of 1-2 psi per minute or less) and therefore may need repressurization before vehicle 101 may be operated (e.g., after a long period of non-use) or may need repressurization mid-use.

Figure 4:
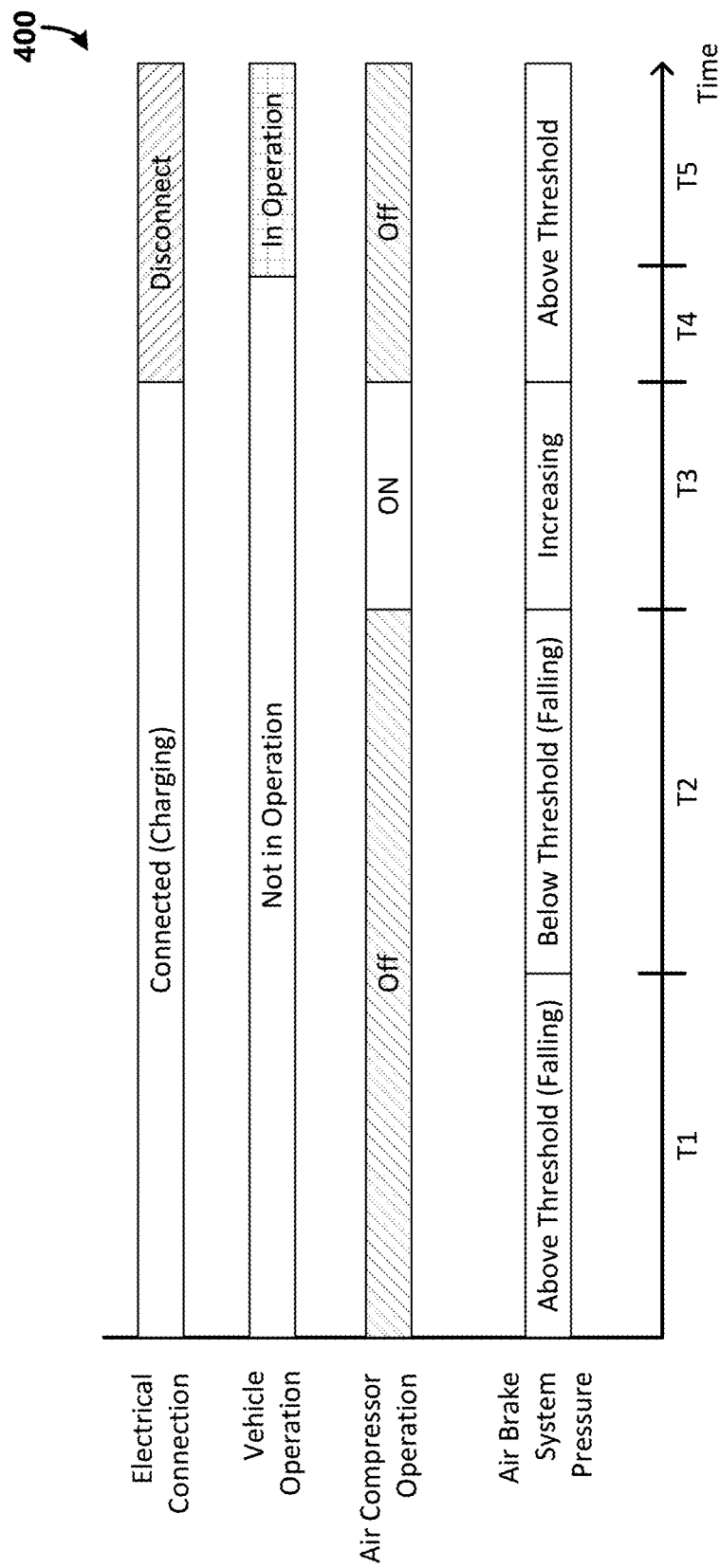
FIG. 4 is a timing diagram illustrating example opportunistic vehicle air brake system repressurization when a vehicle is not in operation, according to an example embodiment.
Figure 5:
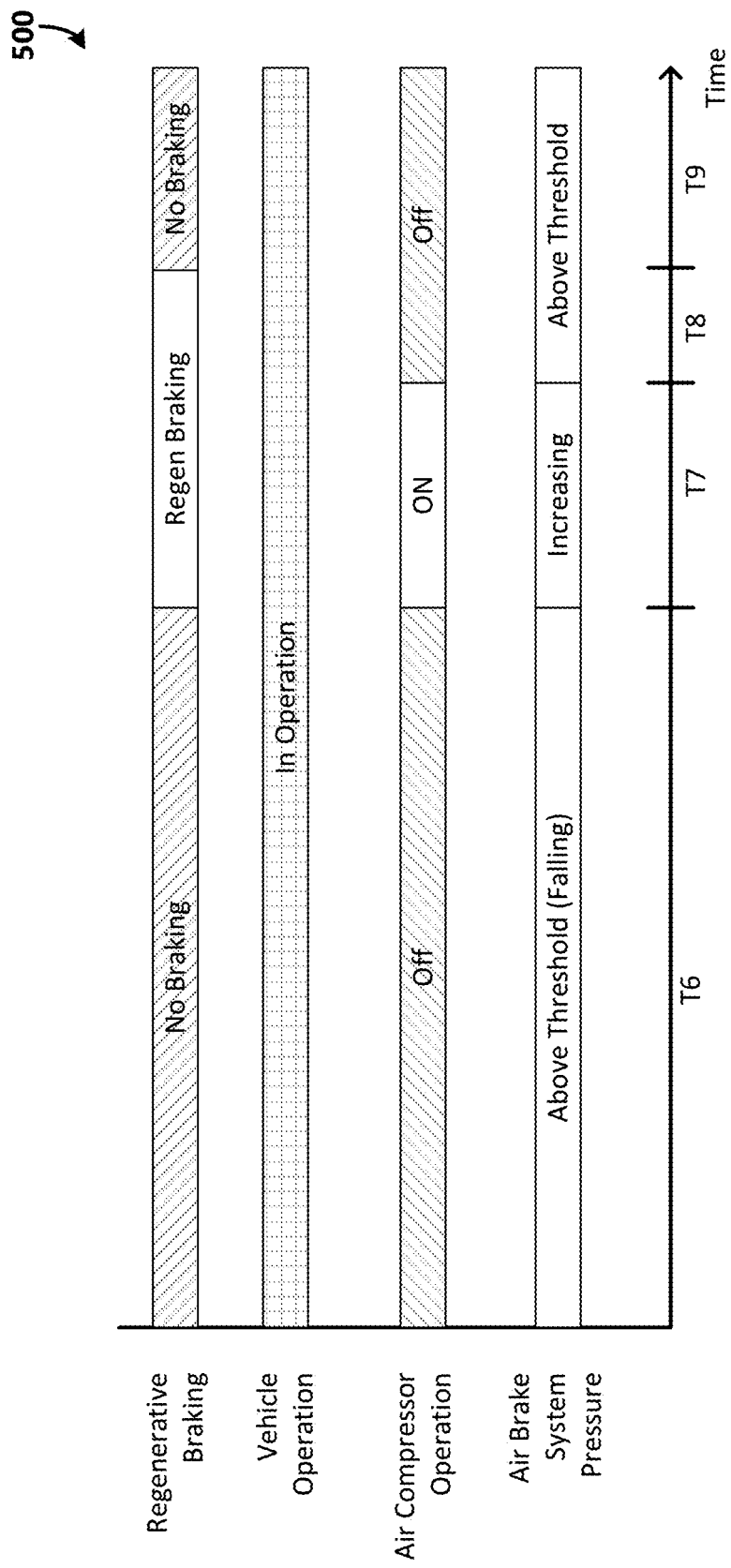
FIG. 5 is a timing diagram illustrating example opportunistic vehicle air brake system repressurization when a vehicle is in operation, according to an example embodiment.

Referring now to FIGS. 4-5, example timing diagrams illustrating example situations in which opportunistic vehicle air brake system repressurization may occur are shown. FIG. 4 illustrates a first timing diagram 400 in which vehicle air brake system repressurization may occur when a vehicle is not in operation, according to a possible implementation.

In the timing diagram 400, a series of time periods T1-T5 are illustrated, representing different possible phases of operation of a vehicle and its subsystems. In time period T1, the vehicle is not in operation. Additionally, the vehicle may be connected to an external electrical connection, for example, because it is connected to an external vehicle charging station 20, as described above. In time period T1, however, a control system of the vehicle may assess a system pressure of an air brake system 110, for example, by determining a pressure within air tanks 114. If the pressure is not below a threshold (e.g., below 60-65 psi, or in some instances below a higher threshold such as 80-100 psi), as seen in time period T1, the air compressor is not in operation.

In time period T2 within the timing diagram 400, the vehicle remains charging and not in operation, but the pressure sensed within the air brake system is below the predetermined threshold. In this instance, in some cases, an additional condition may be considered to be satisfied—that is, external electrical power is available, and the air brake system is below an ideal pressure. However the control system 120 may determine that the vehicle will not be in operation in the near future. This may be based on, for example, a programmed schedule of vehicle operation input by an operator, a learned schedule managed by the controller based on historical operation timing, or other input, such as a remote signal from the user. Accordingly, in time period T2, the air compressor will remain not in operation.

In time period T3 within the timing diagram, the control system 120 may have determined that a time has been reached that is within a predetermined amount of time before expected vehicle operation. The time reached may be variable, selected by the vehicle operator, or chosen based on historical information about how long the vehicle requires to repressurize its air brake system. In example embodiments, the time before expected vehicle operation may be 5-10 minutes or less, or may be a time after receipt of a user indication of impending vehicle operation.

In some instances, the indication of impending vehicle operation may be tied to one or more external events to the air brake system. For example, in some electric vehicles, a vehicle cabin preconditioning operation may be programmed to begin a predetermined or estimated period of time before expected vehicle operation; in such instances, air brake system repressurization may occur during the same or a similar time before operation.

In alternative embodiments, in time period T2, the vehicle will not consider whether operation is near in time, and will instead of waiting for a time closer to operation, will operate the air compressor 116 to repressurize the air brake system. This may be preferably when no operator input has been received regarding an intended schedule, or where historical operation timeframes are either highly variable or unknown.

In time period T4 within the timing diagram 400, the electrical connection is disconnected, indicating that the vehicle 101 is no longer connected to an external power source. In this instance, assuming the air brake system pressure is above a threshold, the air compressor 116 may cease operation. Nevertheless, because the air brake system was repressurized during time period T3, at time period T5 when operation of the vehicle 101 is begun, the vehicle operator 10 does not need to initiate repressurization at the time he or she wishes to begin operating the vehicle, does not need to wait for repressurization of the air brake tanks 114, and does not need to either rely on battery power to supply power to the air compressor 116 or otherwise delay disconnection of an external electrical connection to wait for repressurization to complete.

FIG. 5 is a second example timing diagram 500 illustrating example opportunistic vehicle air brake system repressurization when a vehicle is in operation. The opportunistic vehicle air brake system repressurization reflected in timing diagram 500 may be used in addition to, or in place of, the repressurization arrangement seen in FIG. 4.

In the example shown, the vehicle 101 is illustrated as being in operation in all timing stages T6-T9. In time period T6, no braking is occurring, and the air compressor 116 is not being operated. The control system 120 may continually monitor air brake system pressure, and, in period T6, the air pressure is above the predetermined threshold that is selected for safe brake operation. However, as noted above, air pressure within the air brake system 110 may fall over time, e.g., due to use or leakage.

In time period T7, a regenerative braking process has begun during operation of the vehicle. In this instance, the motor 140 may be generating electrical power which may be returned to the battery subsystem 130 for recharging the battery. Depending on the rate at which energy is generated by the regenerative braking operation, it may be that more energy is generated than may be used to recharge the battery subsystem 130, for example because a rate of recharging the battery subsystem is limited. Optionally, either regardless of the among of electrical energy, or based at least in part on the energy generated by regenerative braking exceeding a rate of battery subsystem recharge, energy generated by regenerative braking may be used to power the air compressor 116, such that it may be used to re-pressurize the air brake system (e.g., air tanks 114) during time period T7.

In time period T8, regenerative braking has continued, but an air brake system pressure has increased to the point that it is above a pressure threshold. In this instance, operation of the air compressor 116 may be discontinued, since at least the below-pressure condition is no longer satisfied. In time period T9, the regenerative braking event has also discontinued, and operation may continue as in time period T6.

It is noted that there may be additional time periods during operation of a vehicle in which the air compressor 116 should be operated, but where no external power source (such as regenerative braking of an external electrical connection) are available. For example, if, in time period T6 the air brake system pressure fell below a safe threshold, the air compressor 116 may be actuated, despite the fact that no regenerative braking event has occurred/is occurring. Additionally, the time during which regenerative braking occurs may be shorter than a time required to repressurize regenerative brakes, rather than longer (as is seen in time periods T7-T8); in some instances, the air compressor will be allowed to continue operation after a regenerative braking event has ended (e.g., into time period T8) if an air pressure within the air brake system has not yet returned to above the predetermined threshold. Other alterations and variations of the timing diagrams 400, 500 are possible as well, consistent with the present disclosure.

Figure 6:
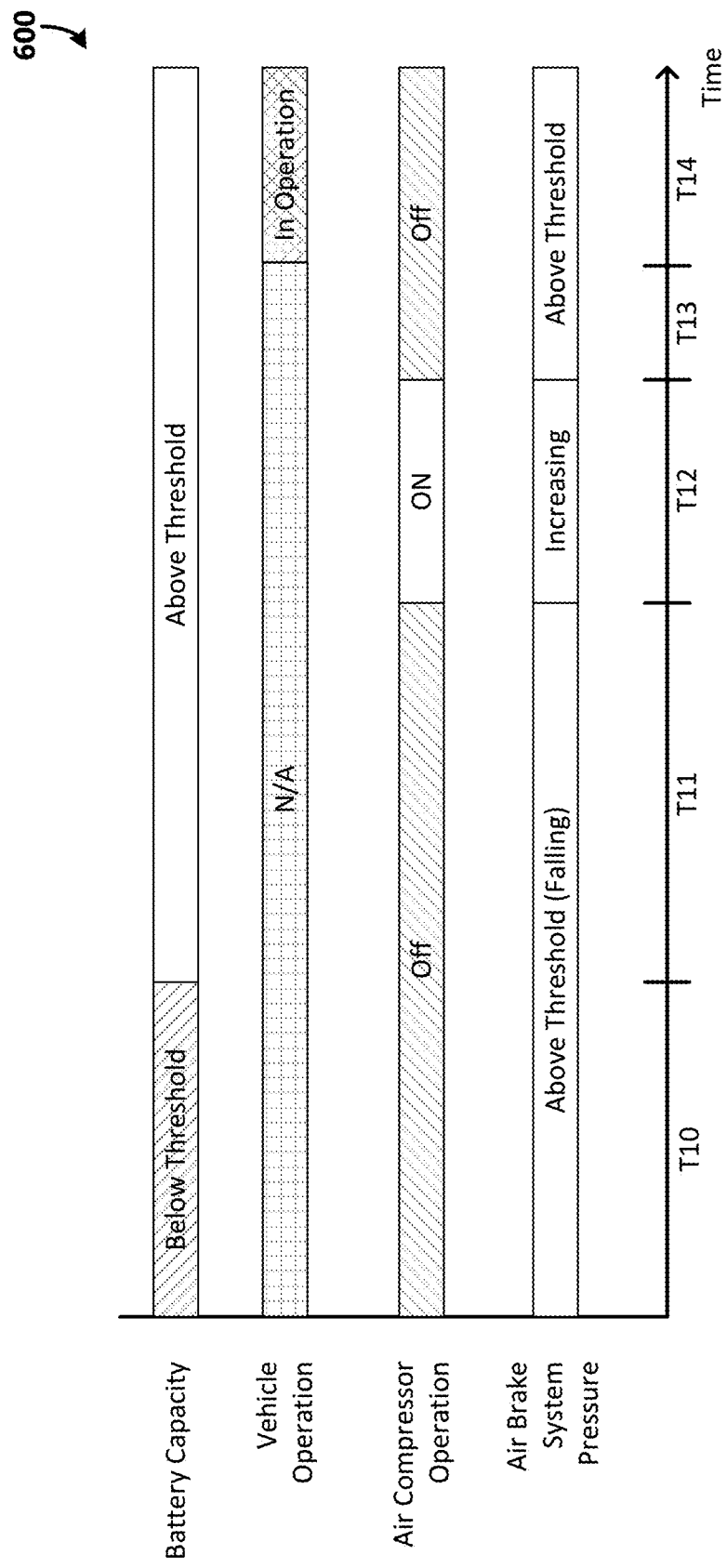
FIG. 6 is a further timing diagram illustrating example opportunistic vehicle air brake system repressurization based on a vehicle battery status, according to an example embodiment.

FIG. 6 is a third example timing diagram 600 illustrating example opportunistic vehicle air brake system repressurization based on a battery charging status. The opportunistic vehicle air brake system repressurization reflected in timing diagram 700 may be used in addition to, or in place of, the repressurization arrangement seen in FIGS. 4-5.

In time period T10, a battery is below a threshold capacity. The threshold capacity may be a programmable threshold, for example 85-90%, at which the battery is considered to be adequately charged to allow for initiation of a repressurization process. In this example, the air brake system pressure is also above a predetermined threshold at which repressurization would be required. Both of these conditions indicate that repressurization during this time period would be suboptimal.

In time period T11, the battery has been charged to a battery charge level above the predetermined threshold. This may be due to the battery being recharged via an external power source, such as either an external power connection or via regenerative braking. In this time period, the air brake system pressure remains above the predetermined threshold at which repressurization would be required, and therefore a repressurization process need not be invoked.

At time period T12, the air brake system pressure has fallen below a predetermined pressure threshold. Additionally, the battery capacity of a vehicle battery (e.g., a battery used for propulsion or an auxiliary battery, such as 12V auxiliary battery) is above the threshold at which the battery is considered adequately charged. Accordingly, during time period T12, a condition for activation of an air compressor 116 may be satisfied. That is, assuming any other conditions that might apply are satisfied, the air compressor will be activated (shown as "ON"), thereby causing an increase in air brake system pressure.

At time period T13, the air brake system pressure will reach or exceed a predetermined threshold, and as such, the air compressor 116 may cease operation. In some instances, operation of the air compressor 116 may cease at a time the battery capacity decreases to the programmed threshold. In other instances, operation of the air compressor may cease upon the air pressure within the air brake system exceeding a pressure threshold, or reaching a target pressure level above the pressure threshold.

At time period T14, the vehicle may begin operation. As illustrated in timing diagram 600, time periods T10-T13 preferably occur when the vehicle is not in operation, since, at least during time period T12, the air brake system pressure would be below a preferred pressure to be maintained during vehicle operation. However, in some instances, one or more of those time periods may include operation of the vehicle. Preferably, time T12 occurs shortly before beginning operation of a vehicle (e.g., prior to T14), such that the air brake system pressure does not have time to depressurize before intended vehicle operation. For example, time period T12 may be selected, for example based not only on battery charge level, but also based on historical operating timing of the vehicle, based on cabin or battery preconditioning operations, or based on vehicle telematics messages received that indicate impending operation of the vehicle.

Figure 7:
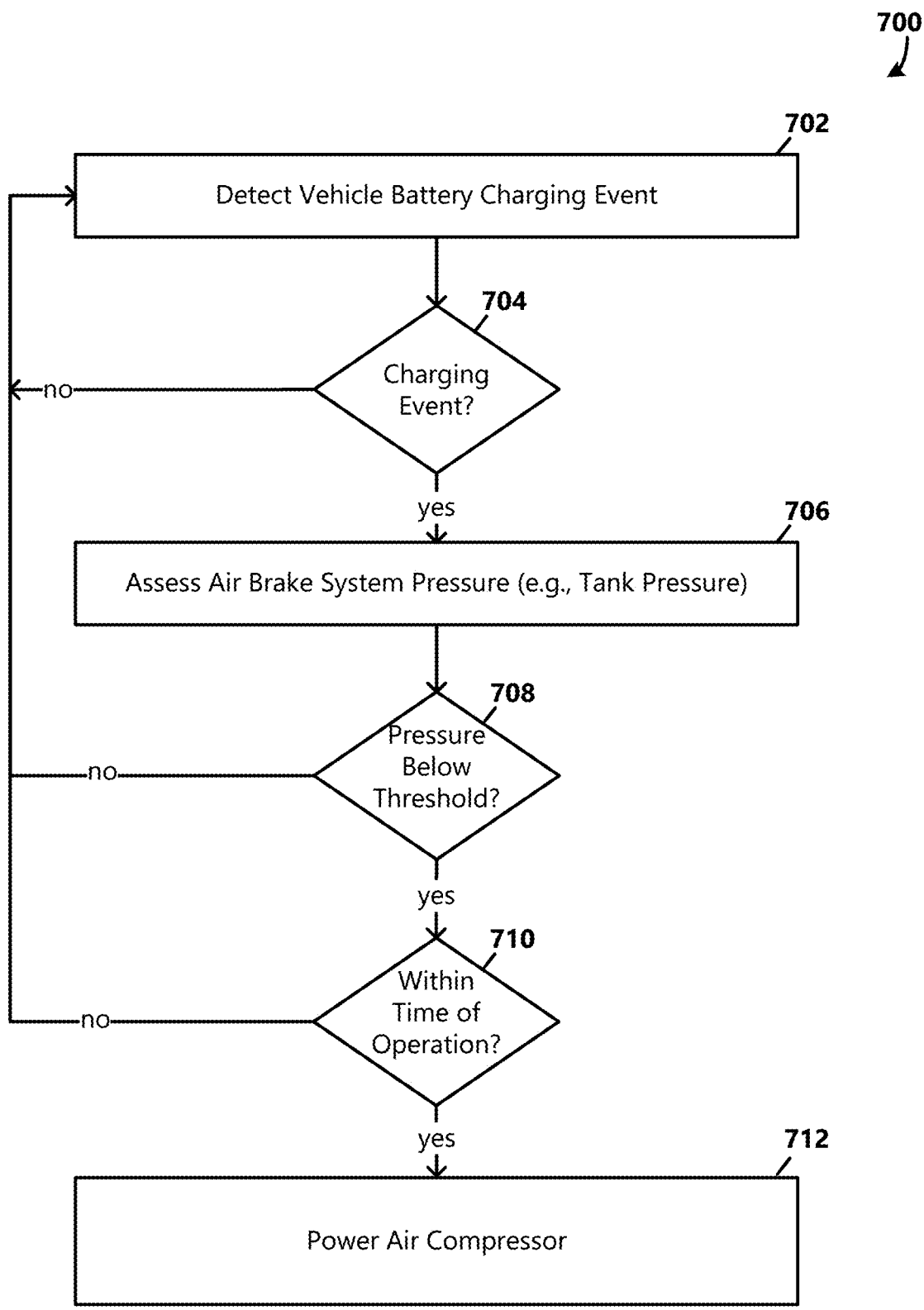
FIG. 7 is a flow diagram depicting general stages of an example process for assessing and performing opportunistic vehicle air brake system repressurization, in accordance with an example embodiment.
Figure 8:
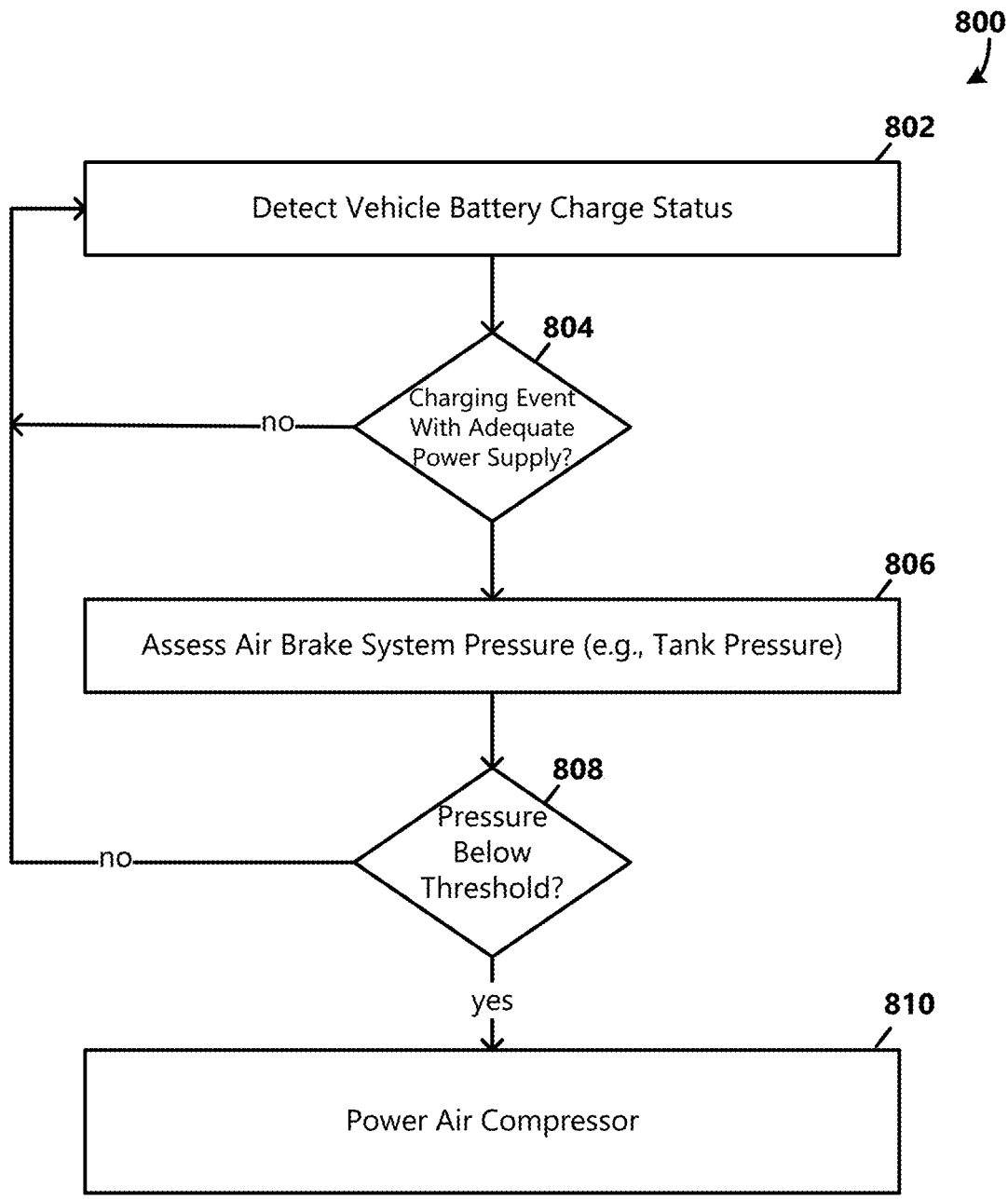
FIG. 8 is a flow diagram depicting general stages of an example process for assessing and performing opportunistic vehicle air brake system repressurization, in accordance with a further example embodiment.

Referring to FIGS. 7-8, flow diagrams of general stages of example processes for assessing and performing opportunistic vehicle air brake system repressurization are shown. The processes described in FIGS. 7-8 are generally able to be performed using a combination of an air brake system 110, controller 120, and optionally some other portions of a vehicle, such as the battery subsystem 130 and motor 140/powertrain 150 of FIG. 1.

Referring first to FIG. 7, an example method 700 includes monitoring for a vehicle battery charging status, at operation 702. Monitoring for a vehicle battery charging status may include, for example, determining whether a connection to an external electrical power source, such as a vehicle charging station 20, is in place.

Continuing at decision operation 704, it is determined whether a charging event is occurring. If a charging event is not occurring, the method 700 may continue at operation 702 to continue monitoring for such a charging event. However, if a charging event is occurring, at operation 706, an air brake system pressure may be assessed. If, at decision operation 708, it is determined that an air brake system pressure is not below a threshold, in some embodiments, flow will return to operation 702 to continue monitoring for future vehicle battery charging events without initiating air compressor operation. In alternative embodiments, even if above a preset threshold, flow may proceed with decision operation 710.

At decision operation 710, it is determined whether the charging event is occurring within a predetermined time before operation of the vehicle. That is, decision operation 710 may determine that expected operation of the vehicle is within a predetermined amount of time, for example based on a preset operation schedule or observed operation and predicted future operation schedule. For example, a control system may be configured to predict impending operation of the vehicle based on a model generated from stored records of past vehicle operation. In still further examples, determining whether the charging event is occurring within a predetermined time includes determining that another vehicle preconditioning operation is occurring, such as a vehicle cabin temperature conditioning operation, a battery temperature conditioning operation, or other preconditioning operations. In still further examples, the predetermined time may be triggered based on a signal from a vehicle operator 10 that operation is impending, for example by the vehicle operator 10 opening a door to a cab of the vehicle, turning on a check lights switch, or other operation typically performed in advance of operation.

In some embodiments, if not within the predetermined operation schedule, it may be deemed unnecessary to activate the air compressor 116, since repressurization of the air brake system would be unnecessary, and that system would likely discharge before operation in any event. Accordingly, flow would return to operation 702. However, in some other embodiments, regardless of whether within a predetermined amount of time before vehicle operation, or if it is determined that vehicle operation is pending (i.e., within the predetermined period), flow proceeds to operation 712, in which an air compressor 116 is powered. In example embodiments, the air compressor may be powered using the external power source used for the vehicle charging event, thereby avoiding use of the battery subsystem to power the air compressor 116.

Referring to FIG. 8, a further example method 800 includes monitoring for a vehicle battery charging status, at operation 802. Monitoring for a vehicle battery charging status, in this instance, may include detecting a regenerative braking operation being performed by the vehicle while the vehicle is in operation. Monitoring for a vehicle battery charging status may also include, in some examples, detecting that a battery charging status is above a predetermined threshold (e.g., above 85-90%, or above some other programmable threshold).

At decision operation 804, it is determined whether a charging status satisfies a particular condition. In some examples, this determination includes determining whether a charging event is occurring that can provide an adequate power supply to deliver electrical power to the air compressor 116. In some instances, operation 804 may include determining whether a charging event provides adequate power without relying on electrical power from the battery subsystem 130, and optionally while concurrently prioritizing electrical power delivery for recharge of the battery subsystem 130. This may include, for example, determining that power obtained by regenerative braking is in excess of the power intake of a battery subsystem 130, and therefore, such excess electrical power may be provided to an air compressor. In alternative instances, operation 804 may include determining whether a battery charging status indicates that the battery is charged above a predetermined charge level, regardless of whether the vehicle is connected to an external charger or whether a regenerative braking operation is occurring.

If this charging status is not satisfied (e.g., inadequate power is provided, no charging event occurs, or battery power is inadequate), flow may return to operation 802. However, if adequate power is provided by way of the charging status, flow proceeds to operation 806, in which an air brake system pressure is assessed. If, at decision operation 808, it is determined that a pressure of the air brake system is below a threshold, at operation 810, the air compressor 116 may be powered. In some circumstances, the air compressor may be powered using power obtained from somewhere other than a battery subsystem (e.g., the source of the battery charging event, such as excess regenerative braking energy). If the air brake system pressure is not below a threshold, in some examples, flow may return to operation 802 to continue to monitor for battery charging events.

Referring generally to FIGS. 7-8, it is noted that certain assessments may be performed in different orders or may be excluded entirely, in some embodiments.

Figure 9:
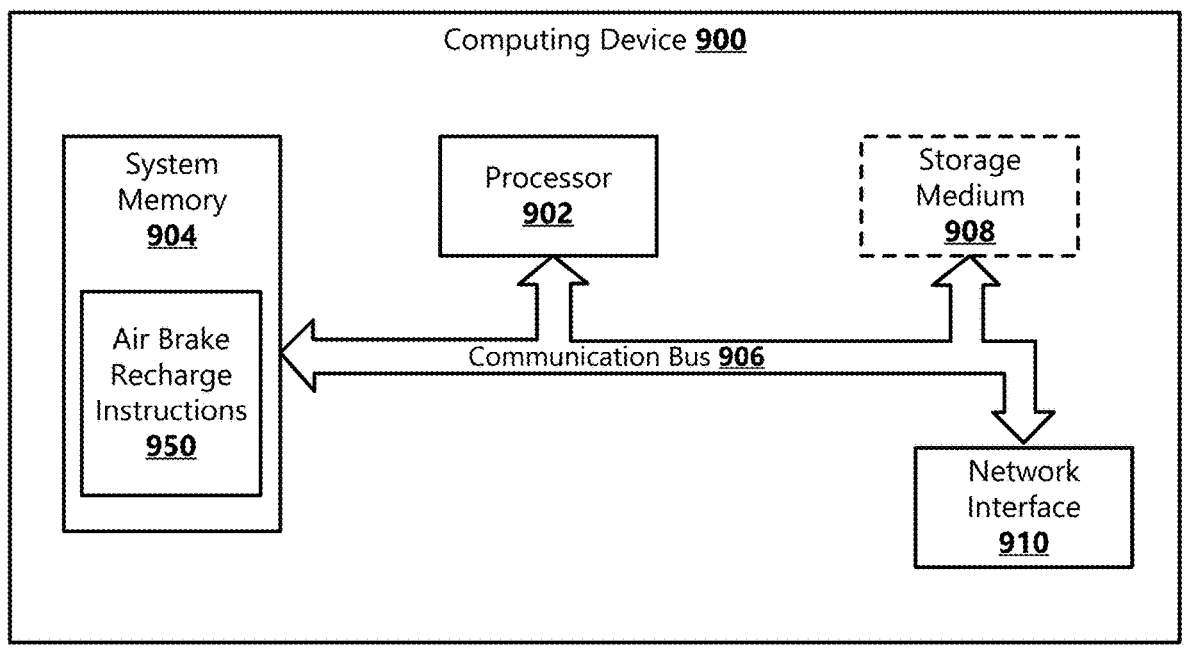
FIG. 9 is a block diagram of an example physical components of a computing device or system with which embodiments may be practiced.

FIG. 9 is a block diagram of an illustrative computing device 900 appropriate for use in accordance with embodiments of the present disclosure. The description below is applicable to the control system 120, servers, personal computers, mobile phones, smart phones, tablet computers, embedded computing devices, and other currently available or yet-to-be-developed devices that may be used in accordance with embodiments of the present disclosure.

In its most basic configuration, the computing device 900 includes at least one processor 902 and a system memory 904 connected by a communication bus 906. Depending on the exact configuration and type of device, the system memory 904 may be volatile or nonvolatile memory, such as read-only memory ("ROM"), random access memory ("RAM"), EEPROM, flash memory, or other memory technology. Those of ordinary skill in the art and others will recognize that system memory 804 typically stores data or program modules that are immediately accessible to or currently being operated on by the processor 902. In this regard, the processor 902 may serve as a computational center of the computing device 900 by supporting the execution of instructions. According to one example, the system memory 904 may store one or more instructions 950 for opportunistic air brake repressurization (e.g., to perform the methods of FIGS. 7-8, above).

As further illustrated in FIG. 9, the computing device 900 may include a network interface 910 comprising one or more components for communicating with other devices over a network. Embodiments of the present disclosure may access basic services that utilize the network interface 910 to perform communications using common network protocols. The network interface 910 may also include a wireless network interface configured to communicate via one or more wireless communication protocols, such as WiFi, 2G, 3G, 4G, 5G, LTE, WiMAX, Bluetooth, or the like.

In the illustrative embodiment depicted in FIG. 9, the computing device 800 also includes a storage medium 908. However, services may be accessed using a computing device that does not include means for persisting data to a local storage medium. Therefore, the storage medium 908 depicted in FIG. 9 is optional. In any event, the storage medium 908 may be volatile or nonvolatile, removable or non-removable, implemented using any technology capable of storing information such as, but not limited to, a hard drive, solid state drive, CD-ROM, DVD, or other disk storage, magnetic tape, magnetic disk storage, or the like.

As used herein, the term "computer-readable medium" includes volatile and nonvolatile and removable and non-removable media implemented in any method or technology capable of storing information, such as computer-readable instructions, data structures, program modules, or other data. In this regard, the system memory 904 and storage medium 908 depicted in FIG. 9 are examples of computer-readable media.

For ease of illustration and because it is not important for an understanding of the claimed subject matter, FIG. 9 does not show some of the typical components of many computing devices. In this regard, the computing device 900 may include input devices, such as a keyboard, keypad, mouse, trackball, microphone, video camera, touchpad, touchscreen, electronic pen, stylus, or the like. Such input devices may be coupled to the computing device 900 by wired or wireless connections including RF, infrared, serial, parallel, Bluetooth, USB, or other suitable connection protocols using wireless or physical connections.

In any of the described examples, data can be captured by input devices and transmitted or stored for future processing. The processing may include encoding data streams, which can be subsequently decoded for presentation by output devices. Media data can be captured by multimedia input devices and stored by saving media data streams as files on a computer-readable storage medium (e.g., in memory or persistent storage on a client device, server, administrator device, or some other device). Input devices can be separate from and communicatively coupled to computing device 900 (e.g., a client device), or can be integral components of the computing device 900. In some embodiments, multiple input devices may be combined into a single, multifunction input device (e.g., a video camera with an integrated microphone). The computing device 900 may also include output devices such as a display, speakers, printer, etc. The output devices may include video output devices such as a display or touchscreen. The output devices also may include audio output devices such as external speakers or earphones. The output devices can be separate from and communicatively coupled to the computing device 900, or can be integral components of the computing device 900. Input functionality and output functionality may be integrated into the same input/output device (e.g., a touchscreen). Any suitable input device, output device, or combined input/output device either currently known or developed in the future may be used with described systems.

In general, functionality of computing devices described herein may be implemented in computing logic embodied in hardware or software instructions, which can be written in a programming language, such as C, C++, COBOL, JAVA™, PHP, Perl, HTML, CSS, JavaScript, VBScript, ASPX, Microsoft .NET™ languages such as C#, or the like. Computing logic may be compiled into executable programs or written in interpreted programming languages. Generally, functionality described herein can be implemented as logic modules that can be duplicated to provide greater processing capability, merged with other modules, or divided into sub-modules. The computing logic can be stored in any type of computer-readable medium (e.g., a non-transitory medium such as a memory or storage medium) or computer storage device and be stored on and executed by one or more general-purpose or special-purpose processors, thus creating a special-purpose computing device configured to provide functionality described herein.

Many alternatives to the systems and devices described herein are possible. For example, individual modules or subsystems can be separated into additional modules or subsystems or combined into fewer modules or subsystems. As another example, modules or subsystems can be omitted or supplemented with other modules or subsystems. As another example, functions that are indicated as being performed by a particular device, module, or subsystem may instead be performed by one or more other devices, modules, or subsystems. Although some examples in the present disclosure include descriptions of devices comprising specific hardware components in specific arrangements, techniques and tools described herein can be modified to accommodate different hardware components, combinations, or arrangements. Further, although some examples in the present disclosure include descriptions of specific usage scenarios, techniques and tools described herein can be modified to accommodate different usage scenarios. Functionality that is described as being implemented in software can instead be implemented in hardware, or vice versa.

Many alternatives to the techniques described herein are possible. For example, processing stages in the various techniques can be separated into additional stages or combined into fewer stages. As another example, processing stages in the various techniques can be omitted or supplemented with other techniques or processing stages. As another example, processing stages that are described as occurring in a particular order can instead occur in a different order. As another example, processing stages that are described as being performed in a series of steps may instead be handled in a parallel fashion, with multiple modules or software processes concurrently handling one or more of the illustrated processing stages. As another example, processing stages that are indicated as being performed by a particular device or module may instead be performed by one or more other devices or modules.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the claimed subject matter.

The invention claimed is:

1. A method comprising:
  determining that a battery recharging event is in progress for a battery of a vehicle;
  determining an impending initiation of operation of the vehicle;
  based on a determination that the battery recharging event is in progress, determining a pressure of an air brake system of the vehicle;
  based on determining that the pressure of the air brake system is below a predetermined threshold during the battery recharging event, activating an air compressor included in the air brake system during the battery recharging event;
  wherein activating the air compressor during the battery recharging event is performed by powering the air compressor from an electrical power source other than the battery a predetermined time before the impending initiation of operation of the vehicle.

2. The method of claim 1, wherein determining that a battery recharging event is in progress includes determining that the vehicle is electrically connected to an external power source.

3. The method of claim 2, wherein the external power source comprises an electric vehicle recharging station.

4. The method of claim 1, wherein determining that a battery recharging event is in progress includes determining that electrical power is being generated is in excess of a battery recharging capacity.

5. The method of claim 1, wherein the vehicle comprises a tractor-trailer.

6. The method of claim 1, wherein the battery of the vehicle comprises a battery used to provide electrical power to an electric motor operatively connected to a powertrain of the vehicle.

7. The method of claim 1, wherein determining the impending operation of the vehicle includes at least one of:
  detecting initiation of a vehicle cabin preconditioning operation;
  identifying that scheduled operation of the vehicle is impending; or
  predicting impending operation of the vehicle based on a model of past vehicle operation.

8. A vehicle comprising:
  a battery operable to power an at least partially electric drivetrain;
  an air brake system including an air compressor;
  a control circuit including a processor and a memory, the memory storing instructions executable by the processor to:
    determine that a battery recharging event is in progress for the battery;
    determine an impending initiation of operation of the vehicle;
    based on a determination that the battery recharging event is in progress, determine a pressure of an air brake system of the vehicle; and
    based on determining that the pressure of the air brake system is below a predetermined threshold during the battery recharging event, activate the air compressor during the battery recharging event a predetermined time before the impending initiation of operation of the vehicle;
  wherein activating the air compressor during the battery recharging event is performed by powering the air compressor from an electrical power source other than the battery.

9. The vehicle of claim 8, wherein the electrical power source other than the battery comprises an electrical power source used during the battery recharging event to perform a battery recharging operation.

10. The vehicle of claim 8, wherein the determination that the battery recharging event is in progress includes a determination that the vehicle is electrically connected to an external power source.

11. The vehicle of claim 10, wherein the external power source comprises an electric vehicle recharging station.

12. The vehicle of claim 8, wherein the determination that a battery recharging event is in progress includes a determination that electrical power is being generated is in excess of a battery recharging capacity.

13. The vehicle of claim 8, wherein the determination of the impending operation of the vehicle includes at least one of:
  detecting initiation of a vehicle cabin preconditioning operation;
  identifying that scheduled operation of the vehicle is impending; or
  predicting impending operation of the vehicle based on a model of past vehicle operation.

14. A non-transitory computer-readable storage medium storing computer-executable instructions which, when executed by a control circuit of a vehicle, cause the control circuit to perform a method of pre-conditioning an air brake system of a vehicle, the method comprising:
  assessing a battery charging status for a battery of a vehicle;
  determining an impending initiation of operation of the vehicle;
  upon determining that a battery charging status meets a predetermined condition, determining a pressure of an air tank within the air brake system of the vehicle;
  based on determining that the pressure of the air brake system is below a predetermined threshold, activating an air compressor included in the air brake system a predetermined time before the impending initiation of operation of the vehicle;
  wherein determining the battery charging status includes at least one of (1) determining that the battery is connected to an external power source, or (2) determining that the battery has a charge level above a predetermined threshold.

15. The non-transitory computer-readable storage medium of claim 14, wherein the external power source comprises an electric vehicle recharging station, and wherein the battery of the vehicle comprises a battery used to provide electrical power to an electric motor operatively connected to a drivetrain of the vehicle.

* * * * *